United States Patent [19]
Fini

[11] Patent Number: 5,103,646
[45] Date of Patent: Apr. 14, 1992

[54] SOLAR AND WIND POWERED GENERATOR

[75] Inventor: John N. Fini, Alexandria, Va.

[73] Assignee: Metex, Inc., Alexandria, Va.

[21] Appl. No.: 635,862

[22] Filed: Dec. 28, 1990

[51] Int. Cl.$^5$ .......................... F03G 6/00; F03G 7/00; F03D 5/00
[52] U.S. Cl. ...................... 60/698; 60/641.8
[58] Field of Search .......................... 60/641.8–641.15, 60/698, 721

[56] References Cited

U.S. PATENT DOCUMENTS

| | | | |
|---|---|---|---|
| 4,229,941 | 10/1980 | Hope | 60/641.15 |
| 4,354,348 | 10/1982 | Lee | 60/641.15 |
| 4,433,544 | 2/1984 | Wells | 60/698 |

*Primary Examiner*—Allen M. Ostrager
*Attorney, Agent, or Firm*—Dickinson, Wright, Moon, Van Dusen & Freeman

[57] ABSTRACT

A wind powered device incorporates a solar furnace and vortex generator to provide additional power and boost the efficiency of the complete system. Two concentric dome assemblies connected by a centrally located shaft are connected to a base with bearings capable of rotating the whole assembly 360° about a vertical axis to allow it to turn into the wind. The two domes form a furnace, an inner dome providing insulation for a solar boiler and an exterior dome refracting the incoming sunlight onto the solar boiler. The solar boiler is located at the center of the inner dome and generates steam to drive fans positioned at the poles of the outer dome. The outer dome also functions as a wind powered rotor. Inlet vanes at the periphery of the dome are open to the atmosphere. The exterior of the dome is provided with trapezoidal or curved channels at regular distances parallel to the path of rotation. These channels effect lift by the venturi effect. They also channel the light to the center of the dome. Fans on the shaft evacuate air from the inside of the dome through openings located at the poles of the outer dome. As air is pulled through the outer dome and through the inlet vanes the outer dome will rotate. The system operates simultaneously as a solar furnace, a wind powered generator and as a vortex generator.

9 Claims, 1 Drawing Sheet

SOLAR AND WIND POWERED GENERATOR

TECHNICAL FIELD

This invention relates to the art of electric generators which are driven by wind and sunlight.

BACKGROUND ART

The inherent notion of solar furnaces, wind-powered machines and a combination of the two, are well known and there is a substantial body of prior art in each category.

Solar Furnaces

Solar furnaces intensify light through the use of either a point focus lens or a parabolic mirror. At the point of focus, a liquid is introduced through appropriate methods and is brought to the boiling point and transferred via a conduit to a steam engine. This steam engine, in turn, will create power to drive an electrical generator. Such systems suffer from a number of design problems that heretofore limited their effectiveness and utility.

Point focus systems must be precisely aligned to track the sun, and therefore require expensive mechanical sun-pointing systems to be effective. Parabolic mirrors suffer from the same alignment problems. These systems tend to be delicate in construction and susceptible to wind—which can cause system misalignment and therefore decreased system efficiency. High winds can also damage a solar powered system (mostly circular or parabolic mirrors) which limits the size of the systems, and therefore can only be located in areas that have high solar radiations and low wind intensity. Solar furnaces also suffer from reduced efficiency when the sky is overcast and obviously offer no utility at night.

Circular or parabolic mirrors are limited to diameters of under eight feet because of potential wind damage. Another problem related to such systems is that they must have vast areas of land to operate efficiently and to create economies of scale.

There have been many attempts to overcome these limitations by redesigning the system to be less environmentally sensitive and to dispense with sun-tracking mechanisms. One way to overcome these limitations is by using a spherical collector—of which there are number in the prior art.

U.S. Pat. No. 4,056,093 by Barger discloses a spherical solar heater. The disclosed design consists of two concentrically mounted and sealed hemispheres. Water, or another liquid, is heated at the bottom of the space between the two hemispheres, and the heated liquid is released at the top.

U.S. Pat. No. by 4,404,961 by Stuhlman discloses an apparatus for collecting solar energy. This design utilizes a hemisphere to heat fluids. The assembly is designed to rotate to follow the sun. The design places a heating tube away from the axis of rotation.

U.S. Pat. No. 4,043,315 by Cooper discloses a solar heat collector having a transparent, spherical outer shell and an inner shell with a plurality of magnifying lenses. The system does not rotate on any axis.

U.S. Pat. No. 4,047,385 by Brinjevec discloses a spherical boiler assembly that has plurality of magnifying lenses mounted above it. Again, there is no rotational component to the system.

None of these patents accommodate any mode of generating supplemental power from the wind. They do, however, validate the efficacy of using a spherical boiler assembly to produce steam in the present invention.

Wind Machines

Wind machines come in a variety of shapes and with varying degrees of efficiency. These systems can be loosely classified as either rotor powered or vortex generators. Rotor-powered systems include, but are not limited to, the Savonius, Darius, wind turbine, Magnus or Flettner Rotors, and horizontal-blade systems. There are also exists in the prior art, spherical wind machines.

U.S Pat. Nos. 4,012,163 by Baumgartner and 4,115,032 by Lange both disclose wind driven generators that are spherical in construction. These designs utilize a plurality of blades to generate useable power. Both systems are mounted on a vertical axis, and therefore, are subject to the Magnus effect.

The Magnus effect subjects such vertical structures to a lift component that is perpendicular to the direction of the wind. While this effect allows the rotor to turn it also causes severe torsional load problems as the system is scaled up. This is discussed in some detail below.

Both confined and unconfined vortex generators spin the wind to increase the power output of the system. Such systems utilize the potential or pressure energy of the wind. It is estimated that such systems can be designed to provide up to six times the power output of conventional wind machines with the same rotor diameter.

However, unconfined vortex generators require shrouds or ducts that add to the complexity and weight of the system to such a degree as to make such systems operationally impractical. And confined vortex generators require large tower-like structures to contain the vortex. These structures are expected to have heights three times the diameter of the tower or nine times the diameter of the turbine. Such structures are necessary due to the fact the system would require the natural flow of air in sufficient quantities to create practical power. U.S. Pat. Nos. 4,07,131 and 4,935,639 both represent forms of vortex generators.

Hybrid Solar/Wind Systems

U.S. Pat. Nos. 4,433,544 by Weils; 4,224,528 by Argo; 4,575,639 by Rogow; 4,779,006 by Worthham; 4,551,631 by Trigilio; 4,369,629 by Lockwood; and 4,229,941 by Hope all disclose systems that utilize both wind and solar power.

U.S. Pat. Nos. 4,433,544 by Weils; 4,224,528 by Argo; and 4,779,006 by Worthham all employ methods of heating ambient air to power a turbine—which in turn drives a generator. The Weils and Argo patents utilize clear panels to raise the temperature of the ambient air. The Wortham patent heats the ambient air using a mirrored surface. None of these disclosed patents utilizes a solar boiler assembly to actively drive the turbine.

U.S. Pat. Nos. 4,575,639 by Rogow; 4,551,631 by Trigilio; 4,369,629 by Lockwood utilize both wind and solar power. However, the solar power is not derived from either the heating of the ambient air nor use of a solar boiler. Rather, these systems use photovoltaic cells by simply adding them onto a wind powered turbine. Therefore, these inventions do not have a direct relation to the present invention.

U.S. Pat. No. 4,229,941 by Hope discloses a system that is claimed to be capable of generating energy from solar and wind energy sources. The system embodies a parabolic mirror to capture sunlight; a mirror assembly and fresnel lens to intensify this sunlight; and a boiler to convert the resultant heat into mechanical energy.

There is also a bladed wind rotor attached to the output shaft of the boiler to garner additional energy from the wind. The system consists of two separate assemblies, one for the parabolic mirror (solar furnace) and the other for the solar boiler and wind rotor. The two assemblies are connected through a fresnel tube that is used to transmit light from the parabolic assembly to the solar boiler. The inherently delicate design of the system requires a high degree of precision in manufacturing and is susceptible to damage by high winds.

The Hope system seems susceptible to damage under high winds due to the torsional loads placed on the vertical shaft of the boiler and wind rotor assembly. It is well known that high winds impart translational force perpendicular to direction of the wind on objects of cylindrical cross-section. This translational force will cause the solar boiler to twist. This twisting motion could cause the tubular fresnel lens assembly to become misaligned and diminish the efficiency of the system. These deficiencies could be partially overcome by the use of very high strength materials, which in turn would raise the cost of the system.

But even such additions would not alleviate certain other deficiencies of the design. First, the co-location of the two assemblies creates a number of design compromises. If these assemblies are located closely together—the wind rotor would be obstructed from direct access to the prevailing wind, if the wind is blowing in the direction behind that of the solar assembly. If in turn, the solar assembly is moved to some distance away from the boiler assembly, the fresnel tube would have to be elongated— which accentuates problems related to the twisting motion of the wind (and subsequent misalignment) that was previously discussed because the rigidity of the tube would be compromised. In addition, the fresnel tube, like all light carrying media would be subject to decreased efficiency due to loss of light intensity caused by the distance the light would have to be conveyed.

The system would also be difficult to scale-up. It is well known that wind power increases as a function of the cube of the surface area of the rotor. Therefore, all the previously discussed translational forces placed on the assemblies would be magnified as the system was enlarged to create more power. Furthermore, there are practical considerations as locating this system at a suitable site.

Wind efficiency increases as a function of height. Therefore, it is desirous to place wind machines on elevating structures to increase efficiency. To elevate the Hope system would require either placing both assemblies on top of one structure or building two structures—one for each assembly. The former choice would create the wind blockage of the rotor of the solar assembly, as previously discussed. The latter choice would require two separate structures—adding to the cost of the system and creating difficult problems of designing a fresnel tube with sufficient rigidity to span the distance between the two towers.

Furthermore, this system also requires a solar tracking mechanism to refract light into the solar boiler, which adds to complexity and systems costs. The costs and complexity of such solar tracking methods have been one of the mitigating factors against the adoption of solar energy systems.

SUMMARY OF THE INVENTION

The present invention relates to wind powered machines, solar heat collectors, and vortex generators and particularly relates to such devices that incorporate all of these arts into a very simple unit with high efficiency.

The present invention comprises a plurality of concentrically mounted assemblies, preferably spherical domes, which connected by a centrally located shaft. The shaft is mounted on a base by bearings such that the whole assembly can rotate 360° about a vertical axis.

The inner dome and a solar boiler are the solar furnace. The inner dome is optically clear and surrounds the solar boiler, the space between the inner dome and the solar boiler is either evacuated or filled with an insulator (such as Aerogel) to retain the heat in the solar boiler.

The inner dome is surrounded by an outer dome, and the two domes are designed to focus incident solar radiation onto the centrally located solar boiler. This design may include, for example, fresnel lens elements which bend the incoming light and concentrate it on the solar boiler.

In addition to assisting in the focussing of light onto the solar boiler, the outer dome is a wind powered rotor. Inlet vanes are at the periphery of the dome and are parallel to axis of rotation. The inlet vanes are closely spaced and open to the atmosphere. The inlet vanes are in the shape of an airfoil and create lift to cause the inner and outer domes to rotate with a resultant angular momentum in a manner described below.

A respective one of two fans is mounted on the central shaft at each end of the outer dome. A turbine is mounted at one end of the outer dome for receiving the steam from the solar boiler and being driven thereby. The turbine is connected to the ducted fans to drive them. In the preferred embodiment, the turbine is connected directly to one fan and the second fan is connected to the first by a shaft which extends through the center of the main shaft supporting the outer dome. The fans communicate with the space between the inner and outer domes to pull air through the inlet vanes on the periphery of the outer dome, through the space between the domes and to vent to the atmosphere. The fans could as well be driven in a direction which would push air through the space between the domes and out the vanes.

The exterior of the outer dome is grooved with trapezoidal or curved channels at regular intervals parallel to the path of rotation. These channels effect lift by creating a venturi, or an area of high lift on the surface of the dome. They also function as light intensifiers (or prisms) by channelling (or refracting) the light to the center of the solar boiler. These channels also create an additional flat-plate area perpendicular to the axis of rotation. This additional area causes the assembly to "weathervane" whereby the dome turns into the incoming air flow.

The central shaft is the main support for the two domes, the ducted fans, and the solar boiler. In addition, this shaft is a conduit for steam generated by the solar boiler and for the returning condensed fluid. A turbine blade and housing are located at one end of the central shaft, but there could be one at each end.

In operation, sunlight passes through the outer dome and the lens formed by the inner dome. The light is focused by these domes onto the solar boiler which converts water to steam or another fluid to a high pressure gas stream. The steam flows through the central shaft and contacts the blades of the steam turbine.

The steam turbine is used to drive the ducted fans which are mounted for rotation on the output shaft. These fans evacuate air from the inner dome, thus causing air to be drawn through the inlet vanes at the periphery of the outer dome. This air flows between the inner and outer domes at high velocity due to the relative low pressure in the space between the domes.

Air flowing between the inner and outer domes is directed parallel to the direction of rotation by the inlet vanes. Some of this air will attach itself to the outside of the inner dome and the inside of the outer dome through the well-known physical properties of annular flow and adhesion and apply an additional force on the domes in the direction of rotation.

The air is accelerated by the ducted fans. This air will be induced to flow in the direction of rotation of the domes, toward the ducted fans, and into the atmosphere. The net effect of this action is a vortex that imparts yet more energy to the inner and outer domes, and they will accelerate to a higher velocity thereby creating more power.

There are secondary and tertiary effects that enhance system performance. The outer dome also functions as a wind-rotor in accordance with the phenomena known as the Magnus (or Flettner) effect. As the outer dome rotates, it carries a thin layer of air with it in the direction of the spin. As wind blows across the dome, the moving airstream interacts with the surface layer of air rotating with the dome. This interaction generates a relative high pressure on the upwind side and a low pressure on the down wind side of the dome. The pressure differential exerts force in a direction at a right angle to the wind. This force can be considerable, depending on wind speed, and allows the system to operate purely as a wind turbine, albeit at reduced efficiencies, when there is no sun.

Another important element is the inlet vanes that are part of the outer dome. These inlet vanes are ducts for the introduction of air into the space between the inner and outer domes. Because they are in the shape of an airfoil, they impart lift and, therefore, torque to the outer dome. They also provide laminar flow control and, therefore, more lift at the rear of the dome through the aerodynamic concept known as boundary-layer control, which prevents airflow separation from the dome at a point of high turbulence.

Yet another aerodynamic principle is brought into play by the addition of grooved, trapezoidal or curved, channels on the exterior of the outer dome. These channels provide multiple benefits to the present invention. First, they create additional lift on the surface through the venturi effect. This effect causes air to accelerate when moving from an large area into a constricted area, such as channel. This acceleration is caused by increased pressure on the air mass. The net effect is the creation of lift in the area of the channel. This lift acts to impart yet more force on the dome in the direction of rotation.

These channels also create an additional flat-plate area perpendicular to the axis of rotation. This additional area creates a "weathervane effect" that will cause the dome to rotate into the direction of the incoming air by the creation of high pressure region on one side of the dome.

These channels also function as light intensifiers and refractors. Since the outer dome is of clear substance— grooves in the outer surface will refract and intensify light as it enters into the inner dome. These grooves also serve to prevent loss of light intensity when the solar boiler is obscured by the either the ducted fans or the inlet vanes. These channels could be optimized to prevent such obscuration by surveying specific sites to ascertain the sun's angles, and through the use of a ray tracing program, modify the angles of the channels for conditions at the site.

This device also functions in such as way as to widen the performance envelope of either a wind turbine or solar furnace. The system can operate in conditions of high solar radiation and no wind. When operating in this mode, the sunlight would induce the solar boiler to create steam, which would subsequently turn the ducted fans. The fans, would in turn, cause the outer dome to turn and power would be generated through means previously described. The steam is recondensed using a fluid return system that allows the reentry of the liquid to the boiler through the inlet.

Conversely, it can operate as purely a wind turbine when there is no solar radiation available. In this mode, the outer dome is induced to spin by the electric generator (motor). Once the outer dome is up to speed, the electric motor would cut out—and revert to generator mode. Wind coming in contact with the outer dome will induce the dome to continue to spin, and therefore, create power.

It is important to note that the complexities of operating in such a wide envelope compels the system to have some sort of control system that can govern the action of the present invention. The nature of this system is not covered under this patent, but exists in the prior art.

DETAILED DESCRIPTION OF THE PREFERRED EMBODIMENT

Figure 1:
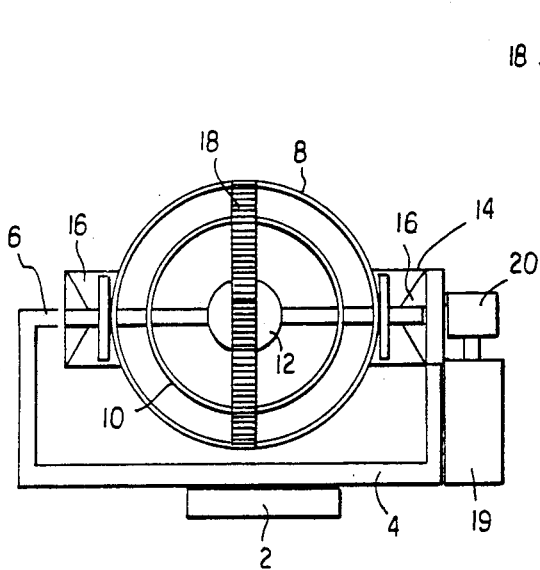
FIG. 1 is a front view of an apparatus in accordance with the invention.

With reference to FIG. 1, a base 2 supports a frame 4 which is mounted to the base by a bearing which allows 360° rotation about a vertical axis. A shaft 6 extends between upper ends of the frame and supports two concentrically mounted domes. An outer dome 8 and an inner dome 10 are connected together for rotation about the central shaft 6.

Mounted within the inner dome is a solar boiler 12. Light passing through the inner and outer domes is focussed by these domes onto the solar furnace. The inner and outer domes are optically clear, and the inner dome provides an insulation barrier around the solar furnace. The outer dome is a spherical or fresnel lens for intensifying the incoming sunlight.

The gap between the inner and outer domes may be filled with Aerogel, an optically clear material that has excellent properties of insulation.

The shaft 6 and frame 4 are hollow and serve as a conduit for fluids flowing through the solar boiler, including steam generated by the solar boiler. Steam is generated in the solar boiler and passes through the hollow shaft 6 to the turbine 14. The turbine 14 is connected to ducted fans 16 at opposite ends of the outer dome. The turbine is preferably connected directly to one of the fans, and the second fan is connected to the first by a shaft (not shown) which extends through the main shaft 6. The fans 16 are mounted to the shaft 6 for rotation and communicate with the space between the inner and outer domes.

As the fans 16 rotate, air is drawn into and through the space between the inner and outer domes and through inlet vanes 18 which are located around the central part of the outer dome. As the air flows into the inlet vanes, the outer and inner domes, which are connected together, begin to rotate. A generator 19 is connected, by a drive shaft (not shown) concentric with the shaft 6, to the outer dome whereby the rotation of the outer dome drives the generator to produce useful output.

Figure 1A:
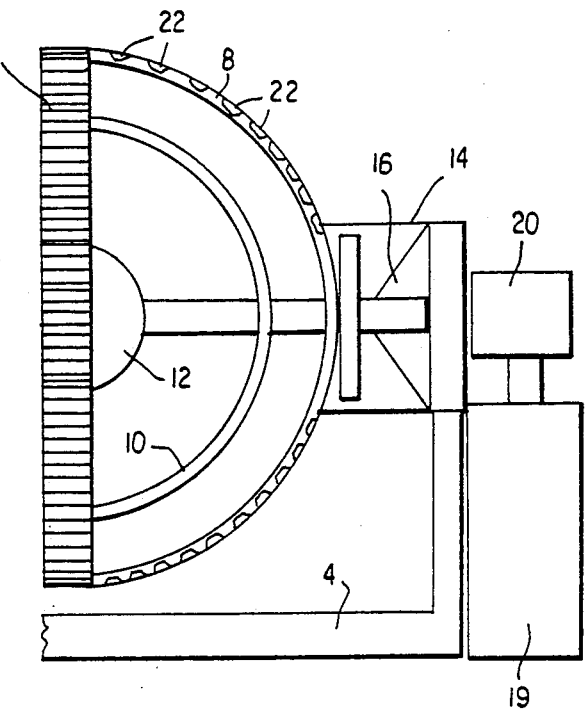
FIG. 1a is a section of FIG. 1 at an enlarged scale for illustrating the detail of the outer dome.
Figure 2:
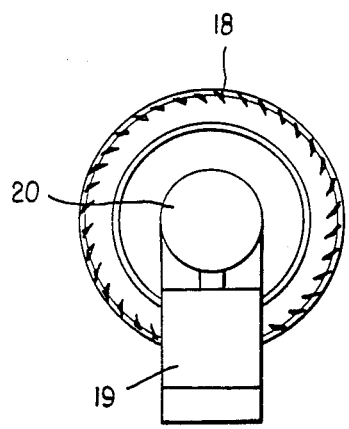
FIG. 2 is a side view of the apparatus shown in FIG. 1.
Figure 3:
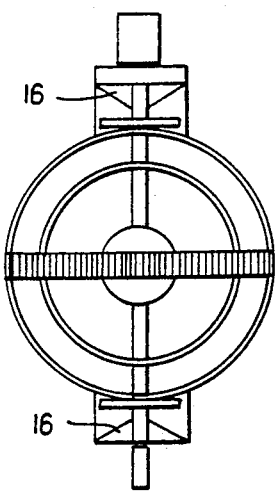
FIG. 3 is top view of the apparatus shown in FIG. 1.

The exterior surface of the outer dome is grooved with trapezoidal (or curved) channels 22 at regular intervals parallel to path of rotation as shown in FIG. 1a. These channels have multiple purposes. First, they create additional lift on the surface through the venturi effect. This effect causes air to accelerate when moving from a large area into a constricted area, such as a channel. This acceleration is caused by increased pressure on the air mass. The net effect is the creation of lift in the area of the channel. This lift acts to impart yet more force on the dome in the direction of rotation. Secondly, they refract light to the center of the interior dome. Third, the channels stiffen the dome by acting as "pseudo-stringers."

In one mode of operation, light passes through the inner and outer domes and onto the solar furnace. Depending on the angle of the sun, light entering the dome will either pass directly or be refracted onto the solar furnace.

The focused light will quickly heat up the fluid in the solar boiler. The heat in the solar boiler is maintained by the air gap, or aerogel, located between the two inner domes. Water, (or another fluid) would be introduced into the solar boiler and steam will be generated and will flow to the turbine blades at the far end of the shaft.

The high pressure steam will cause the turbine blades to rotate about their axes and to rotate a shaft connected to the generator 19.

The power output of the turbine blades is used to spin the two ducted fans attached to the shaft. These fans pull air out of the space between the inner dome and outer domes, creating a partial vacuum, or low pressure area. Air is then induced into the space between the two domes through the inlet vanes 18 located at the periphery of the outer dome. This air will flow into the dome at a high velocity due to the low pressure of the air inside the domes.

These inlet vanes are in the shape of an airfoil. As air flows over the vanes, lift and angular momentum are created and the outer dome will begin to rotate in the same direction of the inner dome. The entrained air is then directed along a path parallel to the rotation. Some of this air will attach itself to the outside of the inner dome and the inside of the outer dome through the well-known physical property of adhesion and apply additional pressure on the domes in the path of rotation.

The remaining air will be accelerated by the suction created by the ducted fans 16. This air will be induced to rotate in the same direction as that of the domes and will rotate toward the ducted fans and be ejected into the atmosphere at openings located at the poles of the outer dome. This creates a vortex that imparts yet more velocity on the inner and outer domes. The resulting spinning action is converted to power through the output shaft that is connected to a suitable transmission 20 which is connected to generator 18.

The spinning of the domes, coupled with the rapid flow of air between the inner and outer domes does not allow for the heat build-up inherent in stagnant air to occur. This makes the system cheaper to fabricate since materials of high thermal tolerance need not be used for the majority of the design. For instance, the outer dome and the fresnel lens could be fabricated out of aviation grade plexiglass or Mylar.

It is important to note, however, that no particular assembly in the present invention, by its nature, is of the optimum form for its particular function. The power output of the system is generated by the innate synergies of these assemblies that produce, in total, much more efficiently than any of these components standing alone.

I claim:

1. Apparatus for using wind and solar energy comprising a base pivotally mounted for rotation about a vertical axis, a shaft carried on said base, said shaft being capable of transmitting a high pressure fluid, an outer means mounted on said shaft for rotation about said shaft, said outer means having inlet vanes for admitting air to the interior of said outer means, said inlet vanes interacting with said air to apply a force tending to rotate said outer means about said shaft, a solar boiler for receiving solar energy, generating said high pressure fluid, and supplying said high pressure fluid to said hollow shaft, turbine means for receiving said high pressure fluid, and fan means driven by said turbine means for causing said air to flow through said interior and said inlet vanes of said outer means.

2. Apparatus according to claim 1 further comprising inner means within said outer means for focussing said solar energy onto said solar boiler.

3. Apparatus according to claim 2 wherein said inner means is spherical.

4. Apparatus according to claim 2 wherein said solar boiler is thermally insulated from said outer means.

5. Apparatus according to claim 4 wherein said inner means is thermally insulated said solar boiler.

6. Apparatus according to claim 1 wherein said outer means includes means for focussing said solar energy onto said solar boiler.

7. Apparatus according to claim 1 wherein the outer surface of said outer means is a spherical dome and includes channels for generating areas of low pressure in response to the flow of air over said channels.

8. Apparatus according to claim 1 further comprising electric generator means for generating electricity connected to said outer means.

9. Apparatus according to claim 1 further comprising condenser means for returning said fluid to said solar boiler.

* * * * *